INVENTOR.
CHARLES PETER SANDERS

INVENTOR.
CHARLES PETER SANDERS

United States Patent Office 3,389,771
Patented June 25, 1968

3,389,771
MAGAZINE FOR FEEDING A PLURALITY OF IDENTICAL ARTICLES TO A DELIVERY POINT
Charles P. Sanders, Foleshill, Coventry, England, assignor to Alfred Herbert Limited, Coventry, England
Filed Dec. 30, 1966, Ser. No. 606,075
Claims priority, application Great Britain, Jan. 19, 1966, 2,434/66
6 Claims. (Cl. 193—15)

ABSTRACT OF THE DISCLOSURE

A magazine for feeding a machine too successively with identical articles each having different diameters in different axial positions, has vertically and laterally adjustable tracks for rolling engagement by the different diameter portions, and also has adjustably spaced side walls for aligning the ends of the articles.

---

Figure 1:
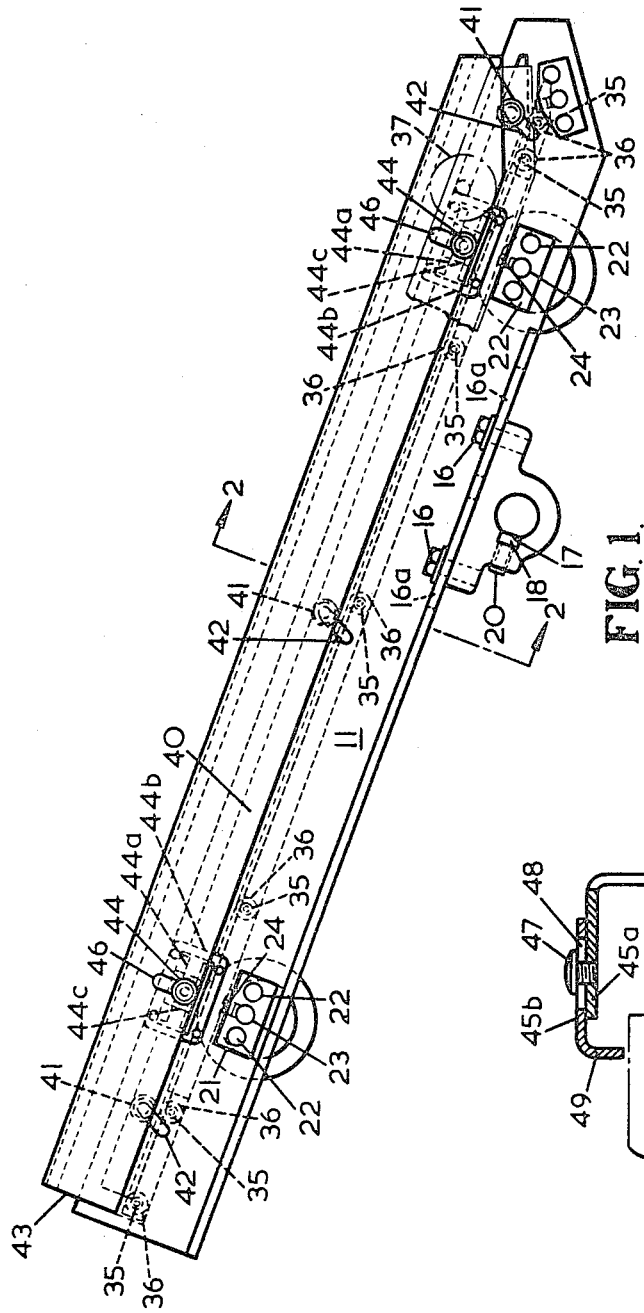

The invention relates to a magazine along which a plurality of identical articles of circular or polygonal cross-section are adapted to be fed sidewise to a delivery point, and has particular, but not exclusive reference to a magazine for the feeding of identical workpieces to a machine tool.

According to the invention the magazine includes guide rail means on which the articles are to roll or slide and which are supported from eccentric means operable for enabling their height to be adjusted.

According to a feature of the invention, and in the case where the articles are axially long or have axially-spaced portions of different transverse dimensions, the guide rail means includes at least two guide rails on which differently transversely dimensioned portions of the articles are adapted to roll or slide, the guide rails being supported from respective eccentric means which are independently adjustable for maintaining the articles with their axes at a common relationship to the horizontal.

In such a case, and according to a further feature the respective eccentric means are supported such that their relative lateral spacing can be adjusted for positioning the coacting guide rails to be rollingly or slidingly engaged optionally with portions of different transverse dimensions of different series of identical articles, the articles in each series differing in shape from those in the other series.

Also in such a case, according to a still further feature, each guide rail has a longitudinal channel in its underside, and the coacting eccentric means includes two circular discs, spaced along the channel and each having a peripheral flange of reduced width to engage in the channel, mounted eccentrically on respective hubs each of which can be rotated and/or slid on a supporting shaft and locked in position for correctly positioning the guide rails.

Preferably, the supporting shaft is relatively non-rotatively supported from side walls defining the width of the magazine.

According to another feature the said side walls are supported so that their lateral spacing can be adjusted to suit the length of the articles to be fed.

According to yet another feature respective longitudinally-extending distance strips, adapted to set the operative width of the magazine, have an inclined pin and slot connection with the inwardly-facing sides of said side walls and can be locked in an adjusted position by screw means.

In the case where the magazine has side walls defining its width, the side walls, according to another feature, support respective, longitudinally-extending, inwardly-facing plates to overlie the articles so as to maintain them on the guide rail means.

In such a case the said plates can be of inverted L-shaped cross-section with their horizontal flanges adapted to overlie the articles and with their vertical flanges having lockable pin and slot connections to the side walls so as to enable their effective heights to be adjusted.

Also in such a case the inwardly-facing edges of the said plates can be provided with downwardly-extending flanges of which the bottom edges are for maintaining the articles on the guide rails.

Figure 2:
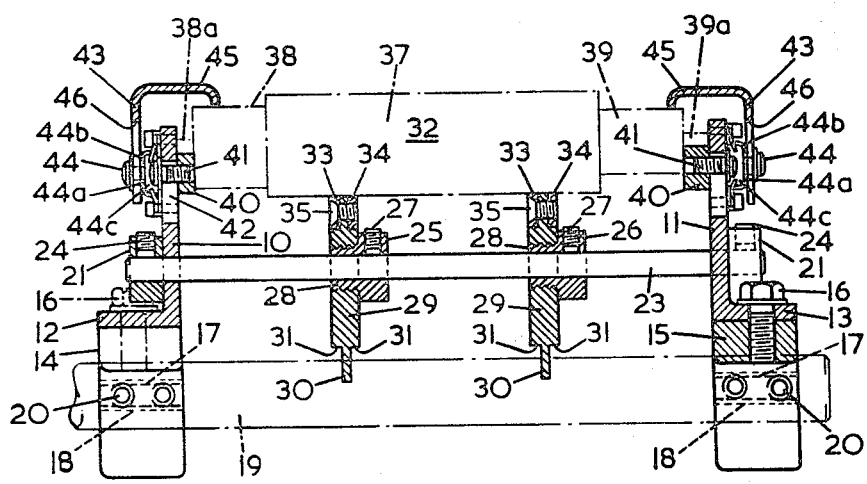

By way of example, one embodiment of the invention, as applied to a magazine for feeding workpieces to a machine tool, will now be described with reference to the accompanying drawings, in which:

FIGURE 1 is a side elevation;
FIGURE 2 is a section generally on the line 2—2 of FIGURE 1, and
FIGURE 3 illustrates a modification of an element shown in FIGURE 2.

Referring to the drawings the magazine includes two side walls 10 and 11 with respective out-turned stiffening flanges 12, 13 at the bottom. Respective clamping blocks 14, 15 are secured to these flanges by screws 16, which extend through slots 16a to permit the said side walls to be adjusted longitudinally of the magazine; and in a bore in each block is a supporting shaft 19 secured to stationary structure (e.g., of a machine tool) not shown. The screws 16 hold the side walls parallel to each other at a desired spacing along shaft 19, and the latter is preferably rotatably supported in the said stationary structure so as to permit the angle of declination of the magazine to be adjusted. Shaft 19 is provided with a longitudinal flat 17 against which respective thrust pads 18, in recesses in the clamping blocks, can be urged by the screws 20.

Each of the side walls, in positions adjacent their upper and lower ends, have external mounting plates 21 secured to them by respective pairs of screws 22, and the upper, and lower pairs of plates 21 have aligned circular holes in registration with holes of the same size in the side walls 10 and 11. Respective upper and lower shafts 23 have their end portions extending through the respective holes and bores and are adapted to be anchored in position by setscrews 24. The shafts 23 are of sufficient lengths to be held in this way over the whole range of adjustment of the clamping blocks 14 and 15 along shaft 19.

In the example shown, each shaft 23 (see FIFURE 2) carries a pair of hubs 25, 26 which can be locked, in desired axially-spaced positions, to the shaft by respective set-screws 27, and each hub has a reduced-diameter, screw-threaded portion 28 engaged in an eccentrically disposed, screw-threaded bore of a circular disc 29 having a peripheral flange 30. The flanges 30 are of less width than the discs so as to leave cylindrical shoulders 31, 31 at each side.

The discs 29 provide supports for a pair of guide rails along which the workpieces, one of which is indicated at 32, can roll or slide from the top to the bottom of the magazine. Each guide rail in the example shown comprises two straight strips 33 and 34 secured together by screws 35 extending through distance washers 36 between them so as to leave a gap closely to accept and lightly grip the flanges 30 of the discs 29 when the screws are tightened.

It will be seen that by slackening set-screws 27, and by sliding the hubs 25 and 26 along shafts 23, and by turning the hubs, both guide rails can be positioned for height and relative spacing so as to be in an appropriate position for the workpieces to roll or slide along them with their axes horizontal.

FIGURE 2 shows a workpiece having a cylindrical centre portion 37, and two respective end portions 38, 38a, and 39, 39a of different smaller diameters. In the case illustrated it is the centre portion 37 which is to roll along the guide rails, but it will readily be understood that by the aforesaid adjustment of the hubs the rails could be spaced further apart, and at different heights so as to be engaged by the portions 38 and 39 instead. When setting up the magazine for feeding a plurality of identical workpieces a desired number of the hubs and discs will be assembled on the shafts 23 to support a like number of guide rails to be rollingly or slidably engaged by selected portions of the workpieces.

As shown by FIGURE 2 each side wall has an end guiding strip 40 secured to its inwardly-facing surface by screws 41. These screws extend through oblique slots 42 in the side walls and the strips serve to provide axial and/or diametral location, with working clearance, for the workpieces. The screws 41 and slots 42 enable the strips 40 to be adjusted for height relatively to the end faces of the workpieces so as to be below their horizontal diameters.

In order to resist any tendency for one workpiece to mount the one in front of it respective longitudinally-extending plates of inverted L cross-section have their vertical flanges 43 secured in position by screws 44, and their horizontal flanges 45 closely overlying the adjacent ends of the workpiece. The screws 44 extend through slots 46 in the flanges 43 so that the positions of flanges 45 can be adjusted to suit the diameter of the end portions of the workpieces. Thus, to enable these L-shaped plates to be adjusted relatively to a delivery point the screws 44 can extend through transverse slots 46 in the plate flanges 43, and through longitudinal slots 44a in brackets 44b secured to side plates 10 and 11. The screws 44 carry clamping nuts 44c. Preferably, however, and as shown in FIGURE 3 the horizontal flanges are formed in two pieces 45a, 45b held together by screws 47, extending through slots 48 in the pieces 45b, which have downturned lips 49 to confine the workpieces, and into screw-threaded holes in pieces 45a. This enables the lips 49 to be adjusted longitudinally of the workpieces.

It will, of course, be understood that if the articles are axially short and of uniform diameter throughout their lengths, one instead of a minimum of two guide rails will be all that is necessary.

What I claim as my invention and desire to secure by Letters Patent of the United States is:

1. A magazine along with a plurality of identical articles of circular or polygonal cross-section are adapted to be slid sidewise to a delivery point, comprising longitudinal stationary guide rails on which the articles rest, and respective supports for said guide rails, said supports incorporating eccentric means and said eccentric means independently operable for enabling the height of the individual guide rails to be adjusted.

2. A magazine according to claim 1 in which the respective eccentric means are supported by means permitting the distance between them to be altered whereby to adjust the spacing of the guide rails.

3. A magazine, according to claim 1, in which each guide rail has a longitudinal channel in its underside, and the coacting eccentric means of the supports comprises two circular discs spaced along the channel and each having a peripheral flange engaged in said channel, a respective hub on which each of said discs is eccentrically mounted, a respective shaft extending through each said hub, and respective means for locking said hubs in a desired position on said shafts for correctly positioning the guide rail.

4. A magazine, according to claim 1, comprising frame structure, upstanding side walls defining the width of the magazine, and means securing said side walls to said frame structure with desired spacing whereby to enable the width of the magazine to be adjusted.

5. A magazine, according to claim 1, comprising frame structure, upstanding side walls secured to said frame structure to define the width of the magazine, and inwardly-facing plates secured to said side walls to overlie the articles in the magazine and maintain them on the guide rails.

6. A magazine, according to claim 5, in which the inwardly-facing plates have depending flanges at their relatively remote edges to be secured to the side walls, said depending flanges and the respective side walls being secured together by lockable pin and slot connections permitting the height of said plates to be adjusted.

References Cited

UNITED STATES PATENTS

| | | | |
|---|---|---|---|
| 666,865 | 1/1901 | Helfensteller | 198—219 |
| 1,208,848 | 12/1916 | Small. | |
| 2,497,768 | 2/1950 | Hallead | 198—219 |
| 2,815,841 | 12/1957 | Dabich | 193—25 |

EVON C. BLUNK, *Primary Examiner.*

M. L. AJEMAN, *Assistant Examiner.*